Nov. 25, 1952    D. H. MONTGOMERY    2,619,357
COLLET

Filed Jan. 25, 1950

INVENTOR
DONALD H. MONTGOMERY
BY
ATTORNEYS

Patented Nov. 25, 1952

2,619,357

UNITED STATES PATENT OFFICE 2,619,357

COLLET

Donald H. Montgomery, West Hartford, Conn., assignor to The New Britain Machine Company, New Britain, Conn., a corporation of Connecticut Application January 25, 1950, Serial No. 140,489

12 Claims. (Cl. 279—60)

1

My invention relates to a collet or chuck, as for use on the spindle of a lathe or the like.

In certain types of collets or chucks, as in the case of those shown and described in the pending patent application of George O. Gridley, Serial No. 49,707, filed September 17, 1948, it may occur that cutting oils or coolants that are played upon the work supported therein may become caught within the collet bore and may thus accumulate to an extent that flow back along the collet tube may occur; such fluids may then spill into the main works, including the spindle-drive or other gears. Such spilled fluids may undesirably dilute and ruin the proper lubrication of the works of the machine, and, of course, there will be an undesirable loss of cutting oil.

It is, accordingly, an object of the invention to provide an improved collet or chuck of the character indicated.

It is another object to provide an improved collet construction wherein cutting oils, coolant fluids, and the like may not be allowed to find their way to the works of the machine.

It is also an object to provide an improved collet construction wherein the entrapment of the cutting oils, coolant, or the like within the collet itself may be minimized.

Another object is to provide an improved jaw-retaining means in a collet construction of the character indicated.

A further object is to provide a collet construction wherein such cutting oils, coolants or the like as may be caught or collect within the collet may be automatically extracted and ejected without being allowed to find their way to the works of the machine.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Figure 1:
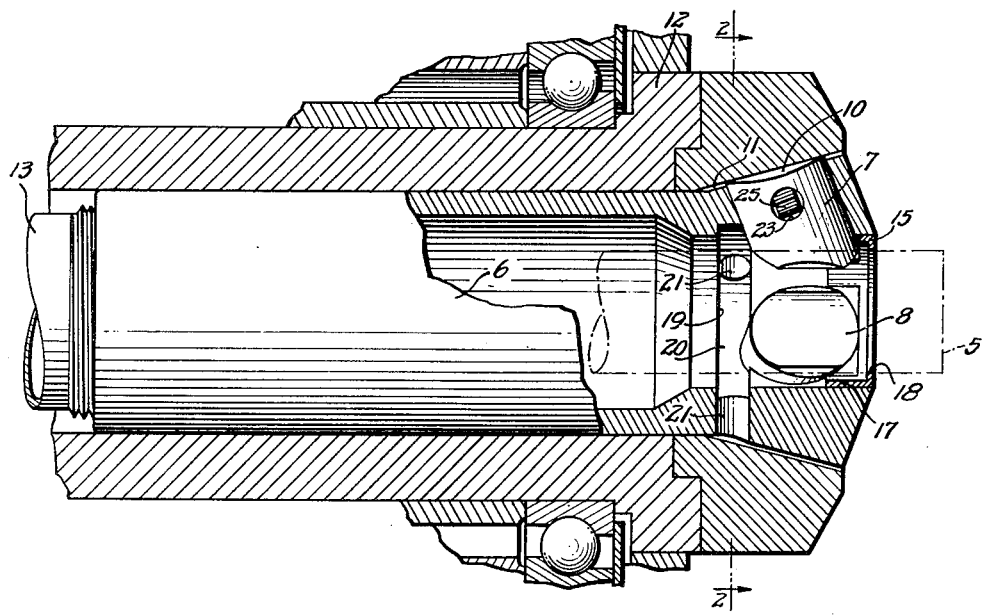
Fig. 1 is a longitudinal view, partly in section, of a collet incorporating features of the invention and shown mounted in the spindle of a machine of the character indicated.
Figure 2:
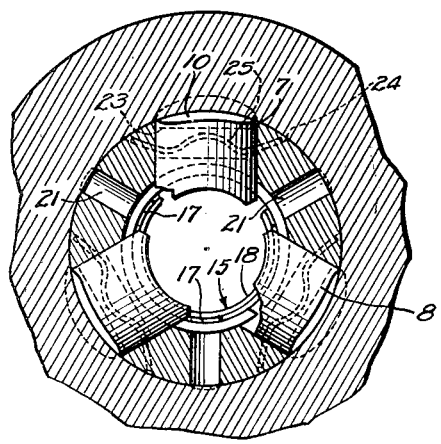
Fig. 2 is a sectional view more or less in the plane 2—2 of Fig. 1.
Figure 3:
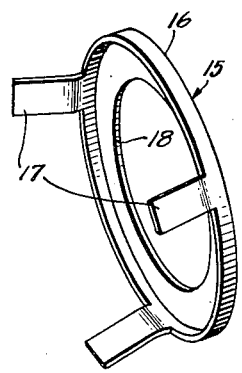
Fig. 3 is an enlarged perspective view of an element shown in the construction of Fig. 1.

Briefly stated, my invention contemplates improved means for application to or for embodiment in collet-type chuck constructions so as to minimize the accumulation of cutting oils, coolants, or the like within the chuck itself and to assure expulsion of such of these fluids as may accumulate, the expulsion being in such a way as to avoid any possible spilling of cutting oils, coolant and the like upon the works of the machine.

In the form to be described, the chucking means is of a variety including replaceable jaws, and novel plug means are provided so as to close off or substantially to close off possible access openings for fluids at the nose of the chucking means. Also, I have provided a novel centrifugally acting manifolding means within the chuck itself, so as to be continuously effective during rotation of the chuck; the manifolding means may utilize centrifugal forces to collect any fluids that might find their way into the collet and forcefully to eject such fluids out the nose end of the collet, free and clear of the works of the machine. The collet shown also incorporates improved jaw-retaining means.

Referring to the drawings, my invention is shown in application to a so-called drawback-type collet, as for use in a machine in which bar stock 5 is to be internally fed. The collet construction may be of the type disclosed in greater detail in the above-identified copending Gridley application and may thus comprise a rigid tubular collet holder 6 with means such as a plurality of angularly spaced generally radially directed holes at one end thereof for guidingly supporting a plurality of jaws 7—8—9. The jaws 7—8—9 may be formed of cylindrical stock with their axes inclined backwardly from a strictly radial plane and with their outer surfaces, as at 10, generally cylindrically arcuately formed for co-action with an outwardly tapering collet seat 11 in the spindle 12 of the machine. The inner ends of the jaws 7—8—9 may be appropriately formed with arcuate work-engaging seats appropriate to the stock size to be accommodated. The collet holder may be attached to a collet tube 13 for draw-back actuation in order that the tapered collet seat 11 may cam the jaws 7—8—9 into binding relation with the work 5.

Collets of the character described are adaptable to a number of different sizes of stock 5 merely by replacing the jaws 7—8—9 with other jaws of size appropriate to other sizes of stock, and there is thus no need to remove the holder 6 from the machine in order to adapt the machine to other sizes of stock. It will be appreciated that in certain cases, and certainly for the case illustrated in the drawings, the jaws 7—8—9 when properly in engagement with the work 5 may project inwardly of the bore of the collet holder 6 so that at the nose end there may be a substantial radial clearance between the collet holder 6 and the work 5. In high-speed cutting operations, cutting oils, coolant fluids and the like may be used, and such fluids may be caught in this annular space between the holder 6 and the work 5, only to find their way to the works of the machine with the above-noted undesirable effects.

In accordance with the invention, I provide novel means for not only cutting down the amount of such fluids that may be permitted to enter the collet but also for positively preventing any flow of such fluids through the collet to the works of the machine. In the form shown, the entrance of such fluids in this annular space is very substantially reduced by employment of shoulder or baffle means 15. The baffle means 15 is preferably removably carried within the bore of the collet holder 6 and at the nose end, as shown; and by providing a particular baffle means 15 for each stock size to be accommodated by a particular set of jaws 7—8—9, it will be appreciated that a particular collet may be readily adapted to receive a variety of stock sizes and for all these sizes to prevent any substantial flow of the undesired fluids into the collet. In the form shown, the baffle means 15 is an annular cup member having a cylindrical rim 16 closely to engage the bore and with resilient means, such as a plurality of spring fingers 17, bent outwardly for a firm grip in the bore of the holder 6, as will be clear. The inner diameter of the cup 15, as at the edge 18, preferably just clears the expected stock diameter for which the jaws 7—8—9 are particularly adapted.

In accordance with a further feature of the invention, I provide means for collecting and for automatically ejecting such fluids as may accumulate within the collet in spite of the baffle means 15. For this purpose, I employ what may be termed centrifugal manifolding means effective upon rotation of the collet to provide an annular accumulation of fluids. The manifolding means may include suitable fluid-conducting means directed generally outwardly toward the collet seat 11. In the form shown, the manifolding means incorporates a radial shoulder 19 which may be the back end of an annular groove 20 formed within the bore of the collet holder 6. The shoulder means 19 may be circumferentially continuous and located rearwardly of the jaws 7—8—9. The fluid-conducting means may be simply one or more radial passages (such as a suitable clearance between a jaw and the back end of the jaw-receiving bore) located forwardly of the shoulder means 19, but in the form shown holes or passages 21 communicate with the recess 20 and face directly toward the collet seat 11. It will be appreciated that the action of the shoulder means 19 may be to accumulate any fluids which may have found their way into the collet and immediately to dispose of such fluids via the holes 21 by flinging them at the tapered seat 11, whereupon the outward flare of the taper may serve to conduct such fluids between the jaws 7—8—9 and outwardly through the nose of the spindle 12.

It will be seen that I have described relatively simple means adaptable to existing-type collet-chuck structures, not only for minimizing the collection of undesired fluids at the work-supporting end (regardless of the size of stock accommodated) but also for automatically disposing of such fluids so as to result in no loss of the cutting and cooling fluids and also so as not to contaminate the works of the machine.

In accordance with a further feature of the invention, I have provided improved jaw-retaining means to hold the jaws 7—8—9 against radially inward dislodgment when spindle rotation ceases. Such means contemplates adjacent abutment means on the jaws and on the holder means 6, with leaf-spring means extending generally circumferentially and in cooperating relation with at least three successive abutment points of the abutment means. In the form shown, the abutment means on each jaw is a transverse hole 23, and the abutment means on the holder 6 includes cut-away recesses 24. Separate leaf springs 25 may be provided for each jaw, and I have shown the springs 25 to have an undulating shape, with generally central abutment in the holes 23 and with outer abutment at both ends, in adjacent recesses 24. It will be clear that the described jaw-supporting means may not interfere with proper collet action and that the jaws will be held against radially inward loss or dislodgment when the spindle is stopped.

While I have described my invention in detail for the preferred form shown, it will be understood that modifications may be made within the scope of the invention as defined in the appended claims.

I claim:

1. In a drawback collet chuck of the character indicated to fit an outwardly tapering seat, a circumferentially continuous tubular holder with a longitudinal bore therein and having a generally radially directed jaw-guide passage from the bore to the outside of said holder, a jaw guided by said passage and projecting externally of said holder for coaction with said seat, said jaw also including a portion projecting inwardly of the bore for coaction with a piece of stock, circumferentially continuous, generally radially inwardly directed shoulder means within said bore and in the axial vicinity of said jaw, and fluid-conducting means in communication with said bore at a position axially forwardly of said shoulder means and generally radially open and directed toward said seat.

2. A collet chuck according to claim 1, in which said fluid-conducting means is a generally radial hole substantially adjacent the forward side of said shoulder means.

3. A collet chuck according to claim 1, in which said shoulder means is located axially rearwardly of said jaw.

4. In a drawback-type collet having a plurality of independent jaws for coaction with an outwardly tapering collet seat, holder means comprising a rigid tube with jaw-holding means at one end, said jaws being guidingly supported by said holder means for independent generally radially inward sliding action, said jaws having a greater effective length in the direction of the generally radial sliding action than the effective generally radial thickness of said holder means at the jaw-holding locations, whereby said jaws may project inwardly and outwardly of said holder means when said collet is closed on a piece of work, thereby providing an annular generally conical outwardly flaring space for propelling fluid in said space out the forward end of said collet, circumferentially continuous centrifugal manifolding means within said tube rearwardly of said jaw-holding means and serving to collect fluids caught within the nose of said holder, said manifolding means including means for radially conducting accumulated fluids to the outer surface of said tube at the expected location of the collet seat.

5. In a collet chuck of the character indicated, a tubular collet holder with circumferentially continuous means at one end for supporting a plurality of independent generally radially movable jaws to cooperate with a collet seat, said jaws being of a length to accommodate a stock size less than the minimum dimension of the bore of said tube, whereby an annular space is defined between the stock and the bore, and circumferentially continuous annular plug means circumferentially continuously fitting said bore at the nose end of said tube and extending radially inwardly from the bore and into close clearance relation with the stock dimension to be accommodated by said jaws.

6. A device according to claim 5, in which said plug means is an annular cup with means resiliently engaging said bore and with an internal dimension slightly in excess of the minimum stock dimension to be accommodated by said jaws.

7. A device according to claim 6, in which said means resiliently engaging the bore includes radially outwardly sprung finger means extending longitudinally to fit between jaws.

8. In a collet, generally tubular jaw holder means, a plurality of generally radially movable jaws including collet-seat-engaging surfaces projecting externally of said holder means and stock-engaging surfaces projecting internally of said holder means, adjacent abutment means on said jaws and on said holder means, and leaf-spring means extending generally circumferentially and in cooperating relation with at least three successive abutment points of said abutment means, whereby jaws may be resiliently held against radially inward dislodgment.

9. A collet according to claim 8, in which said leaf-spring means includes a spring having generally central abutment with a jaw and outer abutment at both ends with said holder means, whereby resilient jaw support may be symmetrical about the axis of jaw movement.

10. A chuck according to claim 1, in which said shoulder means is formed integrally as a part of the bore.

11. In a drawback-type collet of the character indicated, an outwardly flaring seat, a rigid tubular holder of external dimensions clearing said seat, jaw means supported by said holder and projecting outwardly of said holder for contact with the seat and inwardly of the bore of said holder for work engagement, whereby, when work is chucked in said collet, there may be one radial clearance between the work and the bore of said holder and another radial clearance between said holder and said seat, and a circumferentially continuous radially inwardly directed shoulder in the bore of said holder, said holder having a fluid passage communicating between an external part facing said seat and an internal part within said bore and axially forward of said shoulder.

12. In a drawback-type collet of the character indicated, an outwardly flaring seat, a tubular holder of external dimensions clearing said seat and having an angularly spaced plurality of jaw-guide passages axially forward of the back end of said slot, a plurality of jaws in said guides and of an effective length exceeding the effective thickness of said holder at said passages, whereby, when work is chucked in said collet, there may be one radial clearance between the work and the bore of said holder and another radial clearance between said holder and said seat, and a circumferentially continuous radially inward shoulder in the bore of said holder axially rearwardly of said jaws, said holder having a fluid passage communicating between an external part facing said seat and an internal part within said bore and axially forward of said shoulder.

DONALD H. MONTGOMERY.

REFERENCES CITED

The following references are of record in the file of this patent:

UNITED STATES PATENTS

| Number | Name | Date |
| --- | --- | --- |
| 235,283 | Olin | Dec. 7, 1880 |
| 926,761 | Oliver | July 6, 1909 |
| 1,499,727 | Hanson | July 1, 1924 |
| 2,225,377 | Mussari | Dec. 17, 1940 |
| 2,277,260 | Sheffer | Mar. 24, 1942 |
| 2,382,060 | Ingalls | Aug. 14, 1945 |
| 2,396,006 | Hall | Mar. 5, 1946 |
| 2,448,423 | Dodge | Aug. 31, 1948 |